US012659434B2

(12) United States Patent
Chien et al.

(10) Patent No.: US 12,659,434 B2
(45) Date of Patent: Jun. 16, 2026

(54) PROJECTOR AND ADJUSTMENT METHOD FOR CORRECTION FRAME OF PROJECTOR

(71) Applicant: Coretronic Corporation, Hsin-Chu (TW)

(72) Inventors: Chun-Lin Chien, Hsin-Chu (TW); Xuan-En Fung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 453 days.

(21) Appl. No.: 18/296,383

(22) Filed: Apr. 6, 2023

(65) Prior Publication Data

US 2023/0344971 A1 Oct. 26, 2023

Related U.S. Application Data

(60) Provisional application No. 63/334,198, filed on Apr. 25, 2022.

(30) Foreign Application Priority Data

Jul. 11, 2022 (CN) .......................... 202210810887.5

(51) Int. Cl.
*H04N 9/31* (2006.01)
(52) U.S. Cl.
CPC .................................. *H04N 9/3182* (2013.01)
(58) Field of Classification Search
CPC ...... H04N 9/44; H04N 9/3111; H04N 9/3141; H04N 9/3152; H04N 9/3179; H04N 9/3182; H04N 9/3191; H04N 9/3194; H04N 23/73; H04N 23/60; H04N 23/745;

G09G 3/001; G09G 3/006; G09G 3/2003; G03B 21/14; G03B 21/142; G03B 21/145; G03B 21/147
See application file for complete search history.

(56) References Cited

U.S. PATENT DOCUMENTS

| | | | |
|---|---|---|---|
| 2011/0058098 A1 | 3/2011 | Ivashin | |
| 2018/0220114 A1 | 8/2018 | Ouchi | |
| 2019/0361332 A1* | 11/2019 | Kurota | ................. H04N 9/3194 |

(Continued)

FOREIGN PATENT DOCUMENTS

| | | |
|---|---|---|
| CN | 103716603 | 4/2014 |

OTHER PUBLICATIONS

"Search Report of Europe Counterpart Application", issued on Sep. 26, 2023, p. 1-p. 12.

*Primary Examiner* — Sultan Chowdhury
(74) *Attorney, Agent, or Firm* — JCIPRNET

(57) ABSTRACT

A projector includes a projection device, a capturing device, and a controller. The projection device is configured to project an image beam to form a correction frame. The capturing device is configured to capture a correction frame to generate a captured image frame. The controller is electrically connected to the projection device and the capturing device. The controller receives the captured image frame and adjusts the brightness of the correction frame according to the brightness in the capture area of the captured image frame, and records RGB values of the adjusted correction frame and the capturing parameter of the capturing device after adjusted. An adjustment method for the correction frame of the projector is also provided.

15 Claims, 4 Drawing Sheets

(56)          References Cited

U.S. PATENT DOCUMENTS

| 2020/0036949 | A1* | 1/2020 | Tu | ......................... | H04N 9/3185 |
| 2020/0045275 | A1* | 2/2020 | Hsiao | ....................... | G06T 3/067 |
| 2020/0120319 | A1* | 4/2020 | Wu | ....................... | H04N 9/3194 |
| 2020/0244934 | A1* | 7/2020 | Wu | ....................... | H04N 9/3194 |
| 2021/0051304 | A1 | 2/2021 | Ohno | | |
| 2021/0368146 | A1* | 11/2021 | Lee | ....................... | H04N 9/3182 |

* cited by examiner

PROJECTOR AND ADJUSTMENT METHOD FOR CORRECTION FRAME OF PROJECTOR

CROSS-REFERENCE TO RELATED APPLICATION

This application claims the priority benefit of U.S. provisional application Ser. No. 63/334,198 filed on Apr. 25, 2022 and China application serial no. 202210810887.5, filed on Jul. 11, 2022. The entirety of the above-mentioned patent applications is hereby incorporated by reference herein and made a part of this specification.

BACKGROUND OF THE DISCLOSURE

Field of the Disclosure

The present disclosure relates to a projector and an adjustment method for correction frame of the projector.

Description of Related Art

When a camera is adopted as an image correction tool for a projector, it is an important adjustment step to control the parameters of the camera to avoid overexposure of the correction frame. The parameters for adjusting the brightness for the camera to capture images include aperture size, shutter speed, and ISO.

However, currently adopting a camera as the image correction tool for a projector causes the following problems. First, in order to improve the capturing quality and avoid noise, the minimum aperture and ISO are adopted. Therefore, adjusting the shutter speed is now the major method to control the brightness of capturing images. However, the range in which the shutter speed is adjusted may be limited due to the influence of the usage environment. For example, when capturing an image projected by a projector having a color wheel, the shutter speed should be an integer multiple of the color wheel speed to avoid color breaking. Therefore, the user may not just increase the shutter speed to avoid overexposure.

Second, the overexposure of the captured image frame may cause the features of the test pattern to be unrecognizable, resulting in poor subsequent correction effects or termination of the correction process.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The present disclosure provides a projector and an adjustment method for correction frame of the projector, which may make the imaging quality result better after image correction.

Other purposes and advantages of the present disclosure can be further understood from the technical features disclosed in the present disclosure.

To achieve one or part or all of the above purposes or other purposes, an embodiment of the present disclosure provides a projector, which includes a projection device, a capturing device, and a controller. The projection device is configured to project an image beam to form a correction frame. The capturing device is configured to capture a correction frame to generate a captured image frame. The controller is electrically connected to the projection device and the capturing device. The controller is configured to receive the captured image frame and adjust the brightness of the correction frame according to the brightness in the capture area of the captured image frame to form an adjusted correction frame, and record the RGB values of the adjusted correction frame and the capturing parameter of the capturing device after adjusted.

In an embodiment of the present disclosure, RGB values of the above correction frame are (255, 255, 255).

In an embodiment of the present disclosure, the capture area is a specific range having the center point of the captured image frame as the center.

In an embodiment of the present disclosure, the capturing parameter of the capturing device includes shutter speed.

In an embodiment of the present disclosure, the adjustment range of the RGB values of the correction frame is 1-188.

In an embodiment of the present disclosure, the capturing parameter of the capturing device is unchanged, the brightness of the adjusted correction frame is less than the brightness of the correction frame, and both the correction frame and the adjusted correction frame are white frames.

To achieve one or part or all of the above purposes or other purposes, an embodiment of the present disclosure provides a method for adjusting a correction frame of a projector, which includes the following steps: projecting an image beam to form a correction frame by the projection device; capturing the correction frame to generate a captured image frame by the capturing device; adjusting the brightness of the correction frame according to the brightness in the capture area of the captured image frame to form an adjusted correction frame, and recording RGB values of the adjusted correction frame and the capturing parameter of the capturing device after adjusted.

In an embodiment of the present disclosure, the method for adjusting the correction frame of the projector further includes the following step: setting the capturing parameter of the capturing device according to the auto exposure function of the capturing device.

In an embodiment of the present disclosure, the step of capturing the correction frame to generate the captured image frame by the capturing device includes the following step: capturing the correction frame according to the capturing parameter of the capturing device.

In an embodiment of the present disclosure, the capture area is a specific range having the center point of the captured image frame as the center.

In an embodiment of the present disclosure, the capturing parameter include shutter speed. The steps of adjusting the brightness of the correction frame according to the brightness in the capture area of the captured image frame to form the adjusted correction frame, and recording the RGB values of the adjusted correction frame and the capturing parameter of the capturing device after adjusted include the following steps. When the brightness of the capture area exceeds the preset brightness and the shutter speed of the capturing device has reached the maximum value, the controller reduces the brightness of the correction frame, and then determines whether the brightness of the capture area exceeds the preset brightness. When the brightness of the capture area exceeds the preset brightness and the shutter speed of the capturing device does not reach the maximum value, the controller increases the shutter speed of the capturing device, then determines whether the brightness of the capture area exceeds the preset brightness, and determines whether the shutter speed of the capturing device has reached the maximum value. When the brightness of the capture area is less than or equal to the preset brightness, the controller records the RGB values of the correction frame corresponding to the capture area whose brightness is less than or equal to the preset brightness as the RGB values of the adjusted correction frame, and records the shutter speed of the capturing device corresponding to the capture area whose brightness is less than or equal to the preset brightness as the shutter speed of the capturing parameter after adjusted.

In an embodiment of the present disclosure, the step in which the controller reduces the brightness of the correction frame includes the following step: at least reducing 1 for each RGB value of the correction frame.

In an embodiment of the present disclosure, the capture area includes a plurality of sub-capture areas. The sub-capture areas are respectively multiple specific ranges having multiple specific points in the captured image frame as the center. The correction frame includes a plurality of sub-correction frames. Each sub-correction frame corresponds to one of the sub-capture areas, and the center of each sub-correction frame corresponds to a specific point of the one of the sub-capture areas.

In an embodiment of the present disclosure, the capturing parameter includes shutter speed. The steps of adjusting the brightness of the correction frame according to the brightness in the capture area of the captured image frame to form the adjusted correction frame, and recording the RGB values of the adjusted correction frame and the capturing parameter of the capturing device after adjusted include the following steps. The brightness of the sub-correction frame is adjusted according to the brightness in the sub-capture area of the captured image frame to form an adjusted sub-correction frame, and the RGB values of the adjusted sub-correction frame and the capturing parameter of the capturing device after adjusted are recorded.

In an embodiment of the present disclosure, the steps of adjusting the brightness of the sub-correction frame according to the brightness in the sub-capture area of the captured image frame to form the adjusted sub-correction frame, and recording the RGB values of the adjusted sub-correction frame and the capturing parameter of the capturing device after adjusted include the following steps. When the brightness of the sub-capture area exceeds the preset brightness and the shutter speed of the capturing device has reached the maximum value, the controller reduces the brightness of the sub-correction frame, and then determines whether the brightness of the sub-capture area exceeds the preset brightness. When the brightness of the sub-capture area exceeds the preset brightness and the shutter speed of the capturing device does not reach the maximum value, the controller increases the shutter speed of the capturing device, and then determines whether the brightness of the sub-capture area exceeds the preset brightness, and determines whether the shutter speed of the capturing device has reached the maximum value. When the brightness of the sub-capture area is less than or equal to the preset brightness, the controller records the RGB values of the sub-correction frame corresponding to the sub-capture area whose brightness is less than or equal to the preset brightness as the RGB values of the adjusted sub-correction frame, and records the shutter speed of the capturing device corresponding to the sub-capture area whose brightness is less than or equal to the preset brightness as the shutter speed of the capturing parameter after adjusted.

In an embodiment of the present disclosure, the step in which the controller reduces the brightness of the sub-correction frame includes the following step: at least reducing 1 for the RGB values of the sub-correction frame.

Based on the above, in an embodiment of the present disclosure, the projector and the adjustment method for the correction frame of the projector adopt the capturing device to capture the correction frame to generate the captured image frame, and adjust the brightness of the correction frame according to the brightness in the capture area of the captured image frame to form the adjusted correction frame. In this manner, the projector and the adjustment method for correction frame of the projector may achieve a better result in projector image correction.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
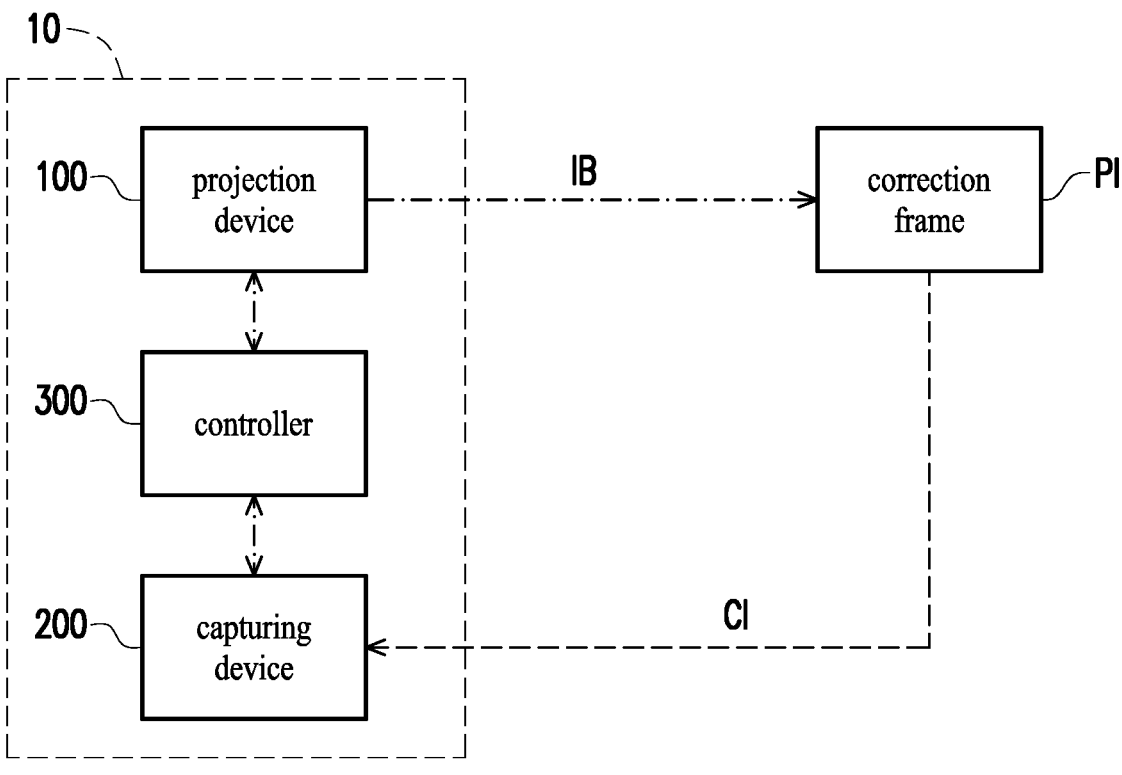
FIG. 1 is a schematic diagram of a projector according to an embodiment of the present disclosure.
Figure 2:
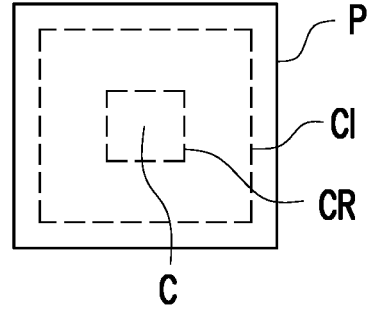
FIG. 2 is a schematic diagram of a correction frame relative to a captured image frame.

FIG. 1 is a schematic diagram of a projector according to an embodiment of the present disclosure. FIG. 2 is a schematic diagram of a correction frame relative to a captured image frame. Please refer to FIG. 1 and FIG. 2, an embodiment of the present disclosure provides a projector 10 and a method for adjusting a correction frame PI of the projector 10. The projector 10 includes a projection device 100, a capturing device 200 and a controller 300. The projection device 100, the capturing device 200 and the controller 300 are disposed in the same device.

In this embodiment, the projection device 100 may include a light source, a color wheel, a light valve, and a projection lens. The light source is configured to emit light beams. The light beams are filtered by the color wheel to generate sequential illumination beams. The illumination beams are converted into image beams IB by the light valve, and the image beams IB are projected by the projection lens. The image beam IB is, for example, projected on a projection target, such as a suitable projection target such as a wall or a projection screen, to form the correction frame PI. The capturing device 200 is, for example, a camera or the like.

In an embodiment, the controller 300 includes, for example, a central processing unit (CPU), a microprocessor, a digital signal processor (DSP), a programmable controller, a programmable logic device (PLD) or other similar devices or a combination of these devices, which is not limited in the present disclosure. In addition, in an embodiment, various functions of the controller 300 may be implemented as multiple codes. These codes are stored in a memory unit, and the codes are executed by the controller 300. Alternatively, in an embodiment, the functions of the controller 300 may be implemented as one or more circuits. The present disclosure does not limit the implementation of the functions of the controller 300 by means of software or hardware. The memory unit is, for example, a removable random access memory (RAM), a read-only memory (ROM), a flash memory or similar components or a combination of the above components.

In detail, the projection device 100 of this embodiment is configured to project the image beam IB to form the correction frame PI. The capturing device 200 is configured to capture the correction frame PI on the projection target to generate a captured image frame CI. The controller 300 is electrically connected to the projection device 100 and the capturing device 200. The controller 300 is configured to receive an information of the captured image frame CI, and adjust a brightness value of the correction frame PI according to a brightness in the capture area CR of the captured image frame CI to form an adjusted correction frame PI, that is, adjust a brightness of the image beam IB projected by the projection device 100. Moreover, the controller 300 is configured to record RGB values of the adjusted correction frame PI and a capturing parameter of the capturing device 200 after adjusted. A center point C of the captured image frame CI is preferably aligned with the center of the correction frame PI. Furthermore, the capture area CR is a specific range having the center point C of the captured image frame CI as the center. The specific range is, for example, a range of 20 pixels×20 pixels, but the present disclosure is not limited thereto. In addition, the RGB values are values of three primary colors of light (red, green, and blue).

Figure 3:
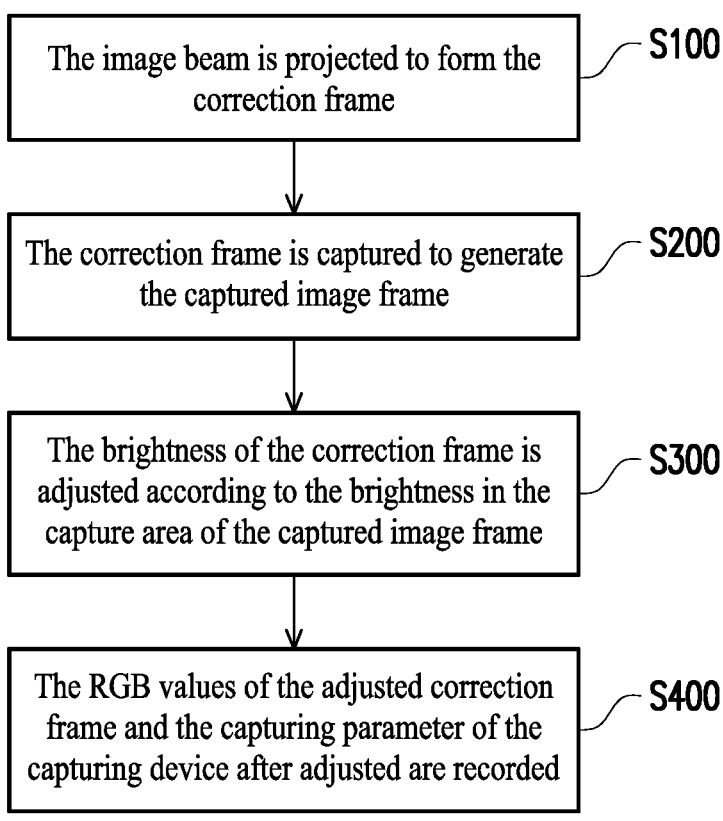
FIG. 3 is a flowchart of a method for adjusting a correction frame of a projector according to the first embodiment of the present disclosure.

FIG. 3 is a flowchart of a method for adjusting the correction frame of the projector according to the first embodiment of the present disclosure. In this embodiment, the method for adjusting the correction frame PI of the projector 10 includes the following steps. Step S100: The image beam IB is projected by the projection device 100 to form the correction frame PI. Step S200: The correction frame PI is captured by the capturing device 200 to generate the captured image frame CI. Step S300: The brightness of the correction frame PI is adjusted according to the brightness in the capture area CR of the captured image frame CI. Step S400: The RGB values of the adjusted correction frame PI and the capturing parameter of the capturing device 200 after adjusted are recorded.

In this embodiment, RGB values of the correction frame PI are (255, 255, 255). That is to say, before adjustment, the projection device 100 may initially project an entirely white frame with maximum brightness. If the capturing device 200 captures the correction frame PI, and the brightness in the capture area CR of the captured image frame CI is not overexposed, the controller 300 may use the brightness of the correction frame PI as the brightness of the adjusted correction frame PI. On the contrary, if the capturing device 200 captures the correction frame PI, and the brightness in the capture area CR of the captured image frame CI is overexposed, the controller 300 controls the projection device 100 to decrease the brightness of the correction frame PI. When the capturing device 200 captures the adjusted correction frame PI, and the brightness in the capture area CR of the captured image frame CI is not overexposed, the controller 300 records the RGB values (brightness) of the adjusted correction frame PI, the adjusted correction frame PI may be a white frame, but the RGB values of the adjusted correction frame PI are less than the RGB values of the correction frame PI before adjustment.

Figure 4:
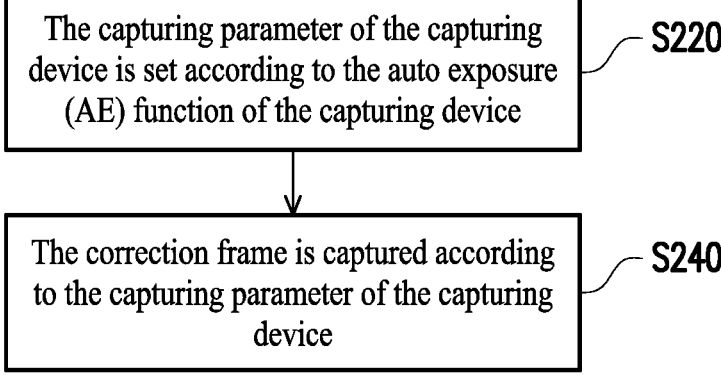
FIG. 4 is a flowchart of generating a captured image frame by capturing a correction frame in a method for adjusting a correction frame of a projector according to the first embodiment of the present disclosure.

FIG. 4 is a flowchart of generating a captured image frame by capturing a correction frame in a method for adjusting a correction frame of a projector according to the first embodiment of the present disclosure. Referring to FIG. 4, in this embodiment, the step S200 of capturing the correction frame to generate the captured image frame in the adjustment method of the correction frame PI of the projector 10 further includes the following steps. Step S220: The capturing parameter of the capturing device 200 is set according to the auto exposure (AE) function of the capturing device 200. The auto exposure function is, for example, a function in which the capturing device 200 automatically adjusts the exposure amount according to the intensity of ambient light. Capturing parameter include, for example, shutter speed, aperture size, and ISO. Since the auto exposure function is adopted to set the capturing parameter of the capturing device 200 first and then the brightness of the correction frame PI is adjusted, a better capturing parameter (such as a reasonable shutter speed) is set to avoid poor adjustment result in the subsequent step caused by, for example, color breaking and so on. That is, the projection device 100 has a color wheel, and the shutter speed of the capturing device 200 should be an integer multiple of the rotation speed of the color wheel to avoid color breaking. The shutter mentioned in the text represents the shutter speed.

In addition, in this embodiment, the step S200 includes a step S240: capturing the correction frame PI according to the capturing parameter of the capturing device 200.

Figure 5:
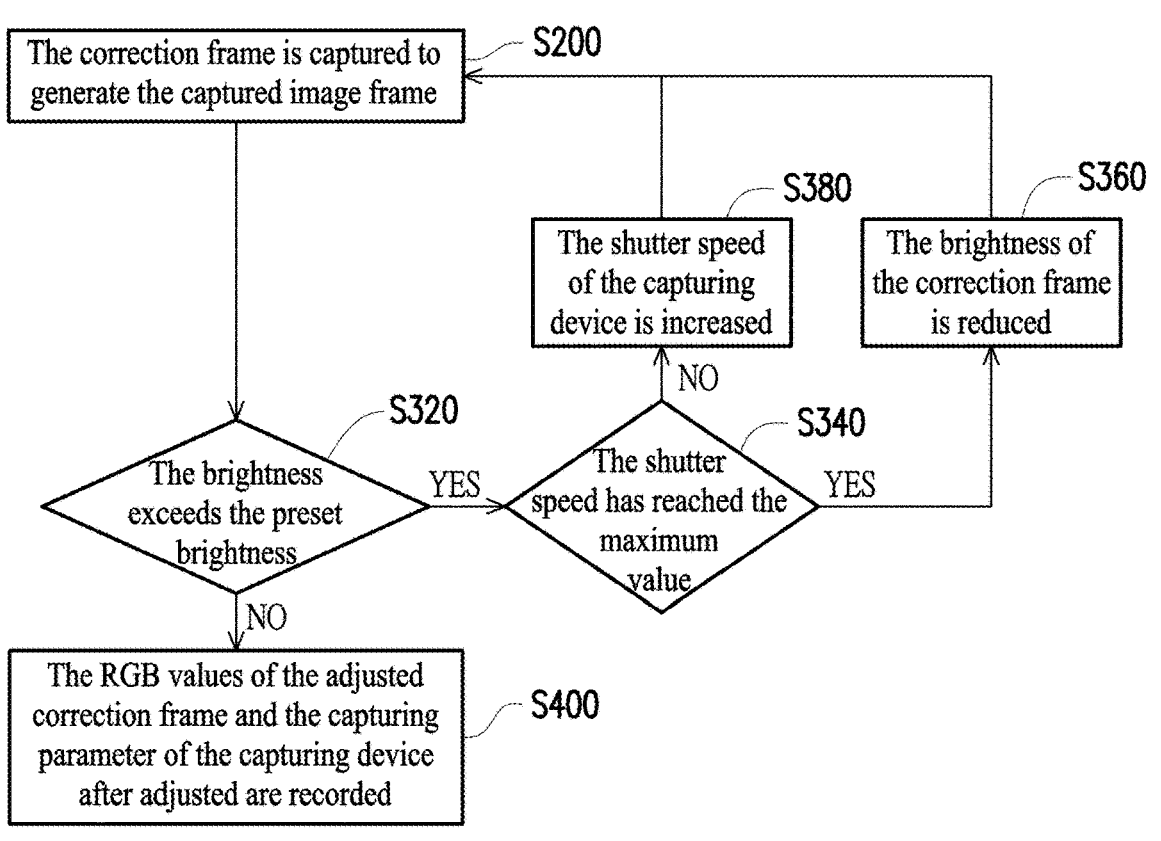
FIG. 5 is a flowchart of adjusting the brightness of the correction frame in the method for adjusting the correction frame of the projector according to the first embodiment of the present disclosure.

FIG. 5 is a flowchart of adjusting the brightness of the correction frame in the method for adjusting the correction frame of the projector according to the first embodiment of the present disclosure. Please refer to FIG. 5, in this embodiment, steps S300 and S400 include the following steps. From steps S320, S340 to S360: when the brightness of the capture area CR of the captured image frame CI exceeds the preset brightness and the shutter speed of the capturing device 200 has reached the maximum value, the controller 300 reduces the brightness of the image beam IB projected by the projection device 100, that is, the brightness of the correction frame PI, and then determines whether the brightness of capture area CR exceeds the preset brightness. From steps S320, S340 to S380: when the brightness of the capture area CR exceeds the preset brightness, but the shutter speed of the capturing device 200 does not reach the maximum value, the controller 300 increases the shutter speed of the capturing device 200, and then determines whether the brightness value of the capture area CR exceeds the preset brightness, and determines whether the shutter speed of capturing device 200 has reached the maximum value. From steps S320 to S400: when the brightness of the capture area CR is less than or equal to the preset brightness, the controller 300 records the RGB values of the correction frame PI corresponding to the capture area CR whose brightness is less than or equal to the preset brightness as the RGB values of the adjusted correction frame PI, and records the shutter speed of the capturing device 200 corresponding to the capture area CR whose brightness is less than or equal to the preset brightness as the shutter speed of the capturing parameter after adjusted.

In this embodiment, the preset brightness value is that any two of the R, G, and B values are 240. That is to say, the criterion for the controller 300 to determine whether the brightness of the capture area CR exceeds the preset brightness may be that, when two components among the R, G, and B values of the capture area CR exceed 240, it means that the brightness of the capture area CR is too high, that is, overexposure phenomenon.

In this embodiment, step S360 includes the following steps. At least the RGB value of each pixel of the correction frame PI is reduced by 1. That is to say, if the RGB values of the initial correction frame PI are (255, 255, 255), the RGB values of the correction frame PI reduced by 1 are (254, 254, 254). However, the present disclosure is not limited thereto, and the controller 300 may adjust the brightness of the correction frame PI by other dynamic adjustment methods, such as a method of gradually reducing the amount of reduction (for example, reducing the brightness by 4 first, then reducing the brightness by 3, etc.). The lower the value of the RGB value of the correction frame PI is reduced each time, it is possible to avoid that the brightness of the adjusted correction frame PI is too low and negatively affects subsequent image processing. On the contrary, the higher the value of the RGB value of the correction frame PI is reduced each time, the adjustment of the correction frame may be accelerated. Therefore, in a preferred embodiment, the value of each the RGB value of the pixel of the correction frame PI reduced by the controller 300 falls within the range of 1 to 188.

In an embodiment of the present disclosure, the projection device 100 projects the image beam IB to form a first correction frame. When the brightness of the capture area CR in the captured image frame CI corresponding to the first correction frame exceeds the preset brightness, and the shutter speed of the capturing device 200 reaches the maximum value, the controller 300 reduces the brightness of the image beam IB projected by the projection device 100, that is, the brightness of the second correction frame (the brightness of the adjusted correction frame) is reduced. In other words, when the capturing parameter (e.g. shutter speed) of the capturing device is unchanged, the brightness of the second correction frame is less than that of the first correction frame, that is, the brightness of the correction frame after adjustment is less than the brightness of the correction frame before adjustment. The first correction frame and the second correction frame are entirely white images.

Based on the above, in an embodiment of the present disclosure, the projector 10 and the method for adjusting the correction frame PI of the projector 10 adopt the projection device 100 to project the image beam IB to form the correction frame PI, and adopt the capturing device 200 to capture the correction frame PI to generate the captured image frame CI, and adjust the brightness of the correction frame PI according to the brightness in the capture area CR of the captured image frame CI. Therefore, the projector 10 and the method for adjusting the correction frame PI of the projector 10 may control/avoid overexposure of the captured image frame CI by adjusting the brightness of the correction frame PI, so that the image quality of the projector 10 after image correction is better. The recorded RGB values of the adjusted correction frame PI and the capturing parameter of the capturing device 200 after adjusted may be applied in the subsequent image correction, so that the subsequent image correction achieves a better effect.

Figure 6:
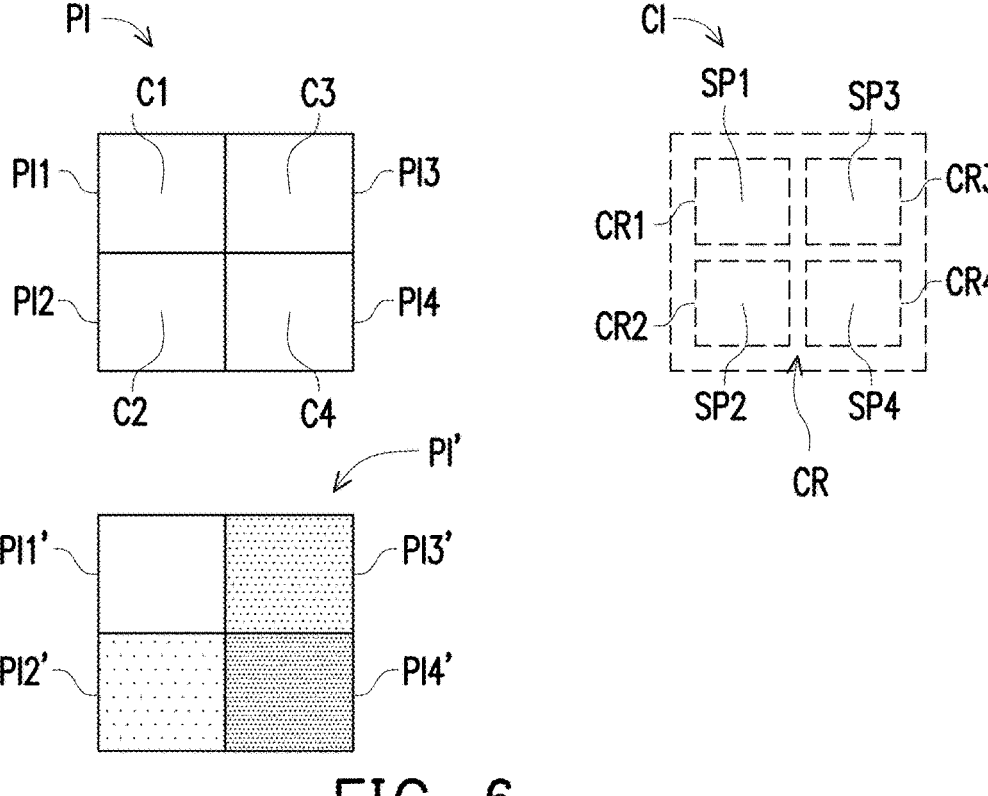
FIG. 6 is a schematic diagram of a capture area including a plurality of sub-capture areas, a correction frame including a plurality of sub-correction frames, and an adjusted sub-correction frame.
Figure 7:
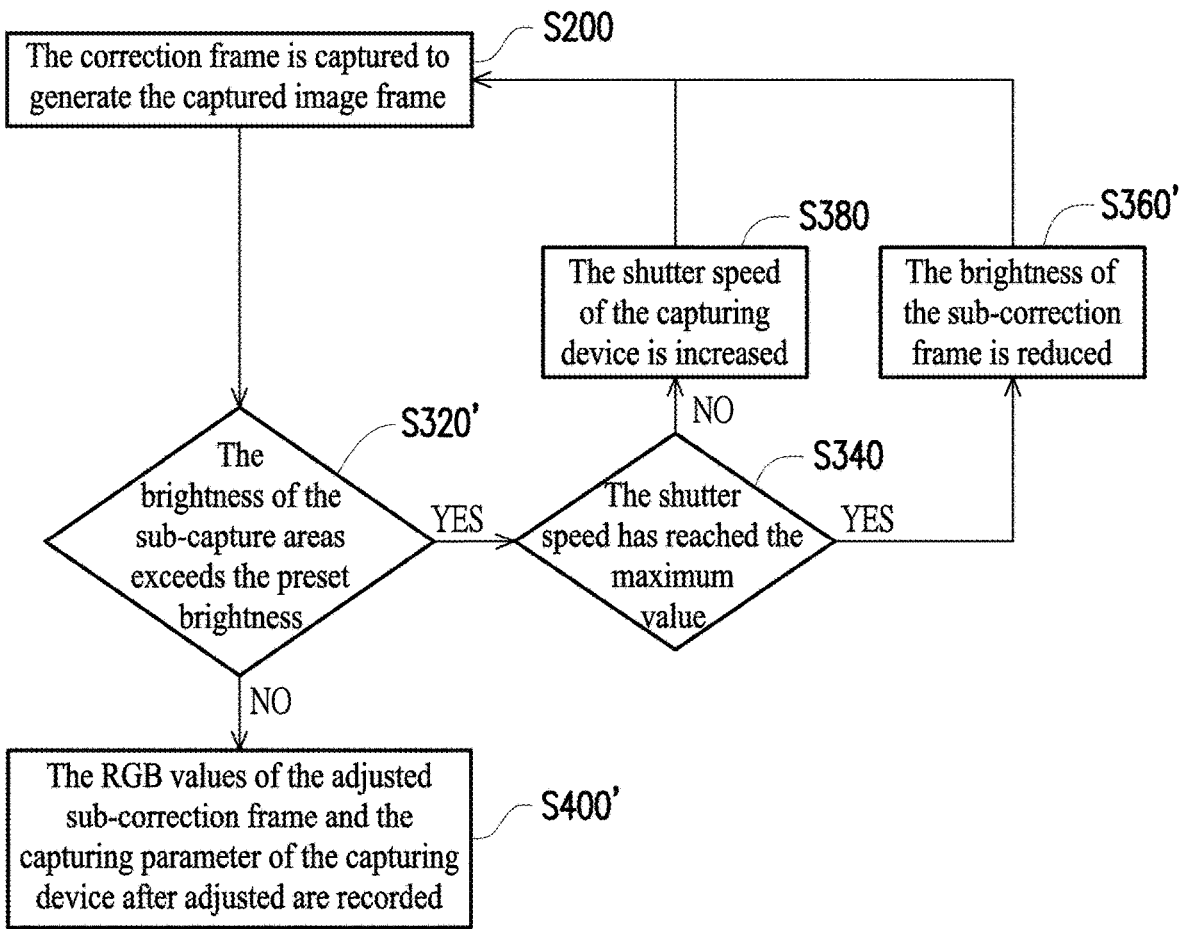
FIG. 7 is a flowchart of adjusting the brightness of each sub-correction frame in a method for adjusting a correction frame of a projector according to the second embodiment of the present disclosure.

FIG. 6 is a schematic diagram of a capture area including a plurality of sub-capture areas, a correction frame including a plurality of sub-correction frames, and an adjusted and corrected sub-correction frame. FIG. 7 is a flowchart of adjusting and correcting the brightness of each sub-correction frame in a method for adjusting a correction frame of a projector according to the second embodiment of the present disclosure. Referring to FIG. 6 and FIG. 7, the projector and adjustment method for correction frame of the projector in this embodiment are similar to the projector 10 of FIG. 1 and the adjustment method for the correction frame of the projector of FIG. 3, and the main differences are as follows. In this embodiment, the capture area CR includes a plurality of sub-capture areas CR1, CR2, CR3, and CR4. The sub-capture areas CR1, CR2, CR3, and CR4 are respectively a plurality of specific ranges having a plurality of specific points SP1, SP2, SP3, and SP4 in the captured image frame CI as the center. The correction frame PI includes a plurality of sub-correction frames PI1, PI2, PI3, and PI4. Each sub-correction frame PI1, PI2, PI3, PI4 corresponds to one of the sub-capture areas CR1, CR2, CR3, and CR4, and the center C1, C2, C3, and C4 of each sub-correction frame PI1, PI2, PI3, and PI4 corresponds to specific points SP1, SP2, SP3, and SP4 of the one of the sub-capture areas CR1, CR2, CR3, and CR4. That is to say, the sub-capture areas CR1, CR2, CR3, and CR4 correspond to the sub-correction frames PI1, PI2, PI3, and PI4, respectively in a one-to-one manner. FIG. 6 shows that the capture area CR includes four sub-capture areas CR1, CR2, CR3, and CR4. However, the present disclosure is not limited thereto, and the number of sub-capture areas should be adjusted according to the actual projection situation of the projector 10. Moreover, FIG. 6 also illustrates that the capture area CR is divided into sub-capture areas CR1, CR2, CR3, and CR4 in an evenly partitioned manner, and the present disclosure is not limited thereto.

In this embodiment, steps S300 and S400' include the following steps. According to the brightness in each sub-capture area CR1, CR2, CR3, and CR4 of captured image frame CI, that is, the RGB values of specific points SP1, SP2, SP3, SP4, the brightness of each sub-correction frame PI1, PI2, PI3, and PI4 is adjusted respectively, and the RGB values of the adjusted sub-correction frames PIP, PI2', PI3', and PI4' and the capturing parameter after adjusted are recorded.

In this embodiment, according to the brightness of each sub-capture area CR1, CR2, CR3, and CR4 of the captured image frame CI, the steps of adjusting the brightness of each sub-correction frame PI1, PI2, PI3, and PI4 respectively, and recording the RGB values of the adjusted sub-frames PI1, PI2, PI3, and PI4 and the capturing parameter of the capturing device 200 include the following steps. From steps S320', S340 to S360': when the brightness of at least one of the sub-capture areas CR1, CR2, CR3, CR4 exceeds the preset brightness, for example, the brightness of the sub-capture area CR1 exceeds the preset brightness, and the shutter speed of the capturing device 200 has reached the maximum value, the controller 300 reduces the brightness of the sub-correction frame PI1, and then determines whether the brightness of the sub-capture area CR1 exceeds the preset brightness. In other embodiments, when the brightness of multiple sub-capture areas in the sub-capture areas CR1, CR2, CR3, and CR4 exceeds the preset brightness, the brightness of the multiple sub-correction frames may also be adjusted correspondingly in sequence according to the above method.

From steps S320', S340 to S380: when the brightness of at least one of the sub-capture areas CR1, CR2, CR3, and CR4 exceeds the preset brightness, and the shutter speed of the capturing device 200 does not reach the maximum value, the controller 300 increases the shutter speed of the capturing device 200, and then determines whether the brightness of at least one of each sub-capture area CR1, CR2, CR3, and CR4 exceeds the preset brightness, and determines whether the shutter speed of the capturing device 200 has reached the maximum value. From steps S320' to S400': when the brightness of each sub-capture area CR1, CR2, CR3, and CR4 is less than or equal to the preset brightness, the controller 300 records the RGB values of the sub-correction frame corresponding to each sub-capture area CR1, CR2, CR3, and CR4 whose brightness is less than or equal to the preset brightness as the RGB values of the adjusted sub-correction frames PI1', PI2', PI3', and PI4', and records the shutter speed of the capturing device 200 corresponding to each sub-capture area CR1, CR2, CR3, and CR4 whose brightness is less than or equal to the preset brightness as the shutter speed of the capturing parameter after adjusted.

In this embodiment, the step in which the controller 300 reduces the brightness of the sub-correction frames PI1, PI2, PI3, and PI4 includes the following step. The RGB values of the sub-correction frames PI1, PI2, PI3, and PI4 are at least reduced by 1, respectively.

That is, when the overall brightness of the correction frame projected by the projector 10 is not uniform, the overexposure condition might only occur to a part of the correction frame. If the overall brightness of the correction frame PI is lowered, the brightness of some areas in the capture area CR might be too low and negatively affects subsequent image processing. Therefore, in the projector and the adjustment method for the correction frame of the projector in the embodiment of the present disclosure, the user divides the captured image frame CI into a plurality of areas through the control interface of the projector 10, such as OSD, and selects sub-capture areas CR1, CR2, CR3, and CR4 based on the center of each area (that is, specific points SP1, SP2, SP3 and SP4). Next, the brightness of the sub-correction frames PI1, PI2, PI3, and PI4 corresponding to each sub-capture area CR1, CR2, CR3, and CR4 is adjusted respectively, so that each adjusted sub-correction frame PI1', PI2', PI3', and PI4' may better present the uniform brightness of the whole frame. The other advantages of the projector and the adjustment method for the correction frame of the projector in the present embodiment are similar to those of the projector 10 of FIG. 1 and the adjustment method for the correction frame of the projector of FIG. 3, and the details will not be repeated here.

To sum up, in an embodiment of the present disclosure, the projector and the adjustment method for the correction frame of the projector adopt the projection device to project the image beam to form the correction frame, and adopt the capturing device to capture the correction frame to generate the captured image frame, and adjust the brightness of the correction frame according to the brightness in the capture area of the captured image frame. In this manner, the projector and the adjustment method for the correction frame of the projector may achieve a better result in projector image correction.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projector, comprising: a projection device, a capturing device, and a controller, wherein the projection device is configured to project an image beam to form a correction image, the capturing device is configured to capture the correction image to generate a captured image, the controller is electrically connected to the projection device and the capturing device, wherein the controller is configured to receive the captured image and adjust a brightness of the correction image according to a brightness in a capture area of the captured image to form an adjusted correction frame, and record RGB values of the adjusted correction image and a capturing parameter of the capturing device after adjusted, wherein an adjustment range of each of the RGB values of the correction image is 1-188.

2. The projector according to claim 1, wherein RGB values of the correction image are (255, 255, 255).

3. The projector according to claim 1, wherein the capture area is a specific range having a center point of the captured image as a center.

4. The projector according to claim 1, wherein the capturing parameter of the capturing device comprises a shutter speed.

5. A projector, comprising: a projection device, a capturing device, and a controller, wherein the projection device is configured to project an image beam to form a correction image, the capturing device is configured to capture the correction image to generate a captured image, the controller is electrically connected to the projection device and the capturing device, wherein the controller is configured to receive the captured image and adjust a brightness of the correction image according to a brightness in a capture area of the captured image to form an adjusted correction image, and record RGB values of the adjusted correction image and a capturing parameter of the capturing device after adjusted, wherein the capturing parameter of the capturing device is unchanged, a brightness of the adjusted correction image is less than the brightness of the correction image, and both the correction image and the adjusted correction image are white images.

6. A method for adjusting a correction image of a projector, comprising:

projecting an image beam to form a correction image by a projection device;

capturing the correction image to generate a captured image by a capturing device; and adjusting a brightness of the correction image according to a brightness in a capture area of the captured image to form an adjusted correction image, and recording RGB values of the adjusted correction image and a capturing parameter of the capturing device after adjusted, wherein an adjustment range of each of the RGB values of the correction image is 1-188.

7. The method for adjusting the correction image of the projector according to claim 6, further comprising:

setting capturing parameter of the capturing device according to an auto exposure function of the capturing device.

8. The method for adjusting the correction image of the projector according to claim 7, wherein the step of capturing the correction image to generate the captured image by the capturing device comprises the following step:

capturing the correction image according to the capturing parameter of the capturing device.

9. The method for adjusting the correction image of the projector according to claim 6, wherein the capture area is a specific range having a center point of the captured image as a center.

10. The method for adjusting the correction image of the projector according to claim 6, wherein the capturing parameter comprises a shutter speed, the steps of adjusting the brightness of the correction image according to the brightness in the capture area of the captured image to form the adjusted correction image, and recording the RGB values of the adjusted correction image and the capturing parameter of the capturing device after adjusted comprise the following steps:

when the brightness of the capture area exceeds a preset brightness and the shutter speed of the capturing device has reached a maximum value, a controller reduces the brightness of the correction image, and then determines whether the brightness of the capture area exceeds the preset brightness;

when the brightness of the capture area exceeds the preset brightness and the shutter speed of the capturing device does not reach the maximum value, the controller increases the shutter speed of the capturing device, then determines whether the brightness of the capture area exceeds the preset brightness; and when the brightness of the capture area is less than or equal to the preset brightness, the controller records RGB values of the correction image corresponding to the capture area whose brightness is less than or equal to the preset brightness as the RGB values of the adjusted correction image, and records the shutter speed of the capturing device corresponding to the capture area whose brightness is less than or equal to the preset brightness as the shutter speed of the capturing parameter after adjusted.

11. The method for adjusting the correction image of the projector according to claim 10, wherein the step in which the controller reduces the brightness of the correction image comprises the following step:

at least reducing 1 for each of the RGB values of the correction image.

12. The method for adjusting the correction image of the projector according to claim 6, wherein the capture area comprises a plurality of sub-capture areas, the sub-capture areas are respectively a plurality of specific ranges having a plurality of specific points in the captured image as a center;

the correction image comprises a plurality of sub-correction images, each of the sub-correction images corresponds to one of the sub-capture areas, and a center of each of the sub-correction images corresponds to the specific point of the one of the sub-capture areas.

13. The method for adjusting the correction image of the projector according to claim 12, wherein the capturing parameter comprises a shutter speed, the steps of adjusting the brightness of the correction image according to the brightness in the capture area of the captured image to form the adjusted correction image, and recording the RGB values of the adjusted correction image and the capturing parameter of the capturing device after adjusted comprise the following steps:

adjusting a brightness of the sub-correction image according to a brightness in the sub-capture area of the captured image to form an adjusted sub-correction image, and recording RGB values of the adjusted sub-correction image and the capturing parameter of the capturing device after adjusted.

14. The method for adjusting the correction image of the projector according to claim 13, wherein the steps of adjusting the brightness of the sub-correction image according to the brightness in the sub-capture area of the captured image to form the adjusted sub-correction image, and recording the RGB values of the adjusted sub-correction image and the capturing parameter of the capturing device after adjusted comprise the following steps:

when the brightness of the sub-capture area exceeds a preset brightness and the shutter speed of the capturing device has reached a maximum value, a controller reduces the brightness of the sub-correction image, and then determines whether the brightness of the sub-capture area exceeds the preset brightness;

when the brightness of the sub-capture area exceeds the preset brightness and the shutter speed of the capturing device does not reach the maximum value, the controller increases the shutter speed of the capturing device, and then determines whether the brightness of the sub-capture area exceeds the preset brightness; and when the brightness of the sub-capture area is less than or equal to the preset brightness, the controller records RGB values of the sub-correction image corresponding to the sub-capture area whose brightness is less than or equal to the preset brightness as the RGB values of the adjusted sub-correction image, and records the shutter speed of the capturing device corresponding to the sub-capture area whose brightness is less than or equal to the preset brightness as the shutter speed of the capturing parameter after adjusted.

15. The method for adjusting the correction image of the projector according to claim 14, wherein the step in which the controller reduces the brightness of the sub-correction image comprises the following step:

at least reducing 1 for each of the RGB values of the sub-correction image.

* * * * *